US008262373B2

(12) United States Patent
Reynolds et al.

(10) Patent No.: US 8,262,373 B2
(45) Date of Patent: Sep. 11, 2012

(54) COMPRESSOR HAVING WIRE RETAINER

(75) Inventors: Charles E. Reynolds, Mechanicsburg, PA (US); Todd E. Tesch, Tipp City, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 733 days.

(21) Appl. No.: 12/365,655

(22) Filed: Feb. 4, 2009

(65) Prior Publication Data

US 2009/0200076 A1 Aug. 13, 2009

Related U.S. Application Data

(60) Provisional application No. 61/026,925, filed on Feb. 7, 2008.

(51) Int. Cl.

| | |
|---|---|
| ***F04B 17/00*** | (2006.01) |
| ***H02G 3/04*** | (2006.01) |
| ***F04B 49/00*** | (2006.01) |
| ***H01R 11/00*** | (2006.01) |

(52) U.S. Cl. .................... 417/422; 174/72 A; 174/99 R; 174/100; 417/212; 417/410.5; 439/502

(58) Field of Classification Search ................ 174/72 A, 174/99 R, 100; 417/212, 410.5, 422; 439/685, 439/502; 248/49, 53, 65
See application file for complete search history.

(56) References Cited

U.S. PATENT DOCUMENTS

| | | | | |
|---|---|---|---|---|
| 2,704,302 | A | 5/1955 | Budd | |
| 2,746,715 | A | 5/1956 | Sherrod | |
| 4,383,805 | A * | 5/1983 | Teegarden et al. | 417/308 |
| 4,865,280 | A | 9/1989 | Wollar | |
| 4,865,281 | A | 9/1989 | Wollar | |
| 5,683,236 | A | 11/1997 | Harrison et al. | |
| 5,720,632 | A | 2/1998 | Viklund | |
| 6,584,949 | B1 | 7/2003 | Franchi et al. | |
| 6,935,598 | B2 | 8/2005 | Sono et al. | |
| 7,059,839 | B2 | 6/2006 | Haller et al. | |
| 2002/0136652 | A1 | 9/2002 | Gennami et al. | |
| 2002/0155741 | A1* | 10/2002 | Herrick et al. | 439/199 |
| 2004/0057849 | A1* | 3/2004 | Skinner et al. | 417/410.5 |
| 2004/0253124 | A1 | 12/2004 | Ioi et al. | |

(Continued)

FOREIGN PATENT DOCUMENTS

JP 2007182793 A 7/2007

(Continued)

OTHER PUBLICATIONS

International Search Report dated Aug. 28, 2009 regarding International Application No. PCT/US2009/033202.

(Continued)

*Primary Examiner* — Nimeshkumar Patel
*Assistant Examiner* — Steven Horikoshi
(74) *Attorney, Agent, or Firm* — Harness, Dickey & Pierce, P.L.C.

(57) ABSTRACT

A compressor comprising a shell, a compression mechanism disposed within the shell, a drive shaft for operating the compression mechanism, and a motor for driving the drive shaft. A terminal is secured to the shell for delivering electric current to at least one of the compression mechanism and the motor. A terminal block is engaged with the terminal, and a wire carries the electric current from the terminal and the terminal block. A wire retainer located relative to the compression mechanism supports the wire in a predetermined orientation within the shell.

12 Claims, 9 Drawing Sheets

U.S. PATENT DOCUMENTS

| | | | |
|---|---|---|---|
| 2006/0147314 | A1 | 7/2006 | Haller et al. |
| 2007/0252455 | A1 | 11/2007 | Chang et al. |
| 2007/0252456 | A1 | 11/2007 | Chang et al. |

FOREIGN PATENT DOCUMENTS

| | | | |
|---|---|---|---|
| KR | 20040078932 | A | 9/2004 |

OTHER PUBLICATIONS

Written Opinion of the International Searching Authority dated Aug. 28, 2009 regarding International Application No. PCT/US2009/033202.

Supplemental European Search Report regarding Application No. 09708829.8-1232, dated Apr. 3, 2012.

* cited by examiner

COMPRESSOR HAVING WIRE RETAINER

FIELD

The present disclosure relates to compressors, and more specifically to wire routing within compressors.

BACKGROUND

The statements in this section merely provide background information related to the present disclosure and may not constitute prior art.

Compressors may require electric current to operate. Wires may be used to carry the electric current from an external power source to various devices located within the compressor.

SUMMARY

The present disclosure provides a compressor comprising a shell including an aperture, a compression mechanism disposed within the shell, a hermetic terminal assembly having at least one terminal extending through the aperture, and a plug engaged with the at least one terminal. A component is disposed in the shell that receives an electric current, and a wire carries the electric current from the plug to the component. A wire retainer including a mounting portion secures the wire retainer within the shell and a guide portion connected to the mounting portion secures the wire in a predetermined orientation.

The wire retainer may be mounted between the hermetic terminal assembly and the plug.

The wire retainer may secure the plug to the hermetic terminal assembly.

The guide portion may define a channel and the wire may be disposed within the channel.

The guide portion may extends from the mounting portion at an end of the mounting portion that is located in a direction of the component.

The component may be a capacity modulation system.

The compression mechanism may include an orbiting scroll member and a non-orbiting scroll member, and the wire retainer may be secured to the non-orbiting scroll member.

The guide portion may include at least one notch for securing the wire.

The guide portion may include a plurality of sections that are coupled by hinges and movable relative each other.

The present disclosure also provides a compressor comprising a shell including an aperture, a compression mechanism disposed within the shell, and a hermetic terminal assembly including at least one terminal passing through the aperture for supplying electric current to a component located within the shell. A plug engages with the at least one terminal, and at least one wire extends from the plug. A wire retainer assembly including a mounting portion secures the wire retainer to the compression mechanism and a guide portion secures the wire in a predetermined orientation relative the compression mechanism.

The compression mechanism may include an orbiting scroll member and a non-orbiting scroll member, and the mounting portion may be secured to the non-orbiting scroll member.

A capacity modulation system may receive an electric current carried by the wire.

The present disclosure also provides a manufacturing method, comprising providing a shell including an aperture, disposing a compression mechanism within the shell, mounting a hermetic terminal assembly having at least one terminal through the aperture, and engaging a plug with the at least one terminal. The method also includes connecting a wire that carries the electric current from the plug to a component within the shell, routing the wire through a wire retainer including a guide portion located proximate the plug and the shell to the component, and directing the wire in a predetermined orientation with the guide portion.

The wire retainer may secure the plug to the terminal assembly.

The compression mechanism may include an orbiting scroll member and a non-orbiting scroll member, and the wire retainer may be secured to the non-orbiting scroll member.

The guide portion may include a plurality of sections that are coupled by hinges and movable relative each other.

The method may also include welding an end cap to the shell and protecting the wire with the wire retainer such that when the end cap is welded to the shell, the wire is shielded from heat generated during welding.

The present disclosure also provides a compressor comprising a cylindrical shell including an aperture, a hermetic terminal assembly including at least one terminal passing through the aperture for supplying electric current to a component located within the shell, a plug engaged with the at least one terminal, and at least one wire extending from the plug. A wire retainer assembly includes a mounting portion that secures the wire retainer to the plug and a guide portion that directs the wire in a direction from the aperture to the component.

The wire retainer may be mounted between the hermetic terminal assembly and the plug.

The wire retainer may secure the plug to the hermetic terminal assembly.

The guide portion may define a channel and the wire may be disposed within the channel.

The guide portion may extend from the mounting portion at an end of the mounting portion that is located in a direction of the component.

The component may be a capacity modulation system.

The guide portion may include at least one notch for securing the wire.

The guide portion may include a plurality of sections that are coupled by hinges and movable relative each other.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3:
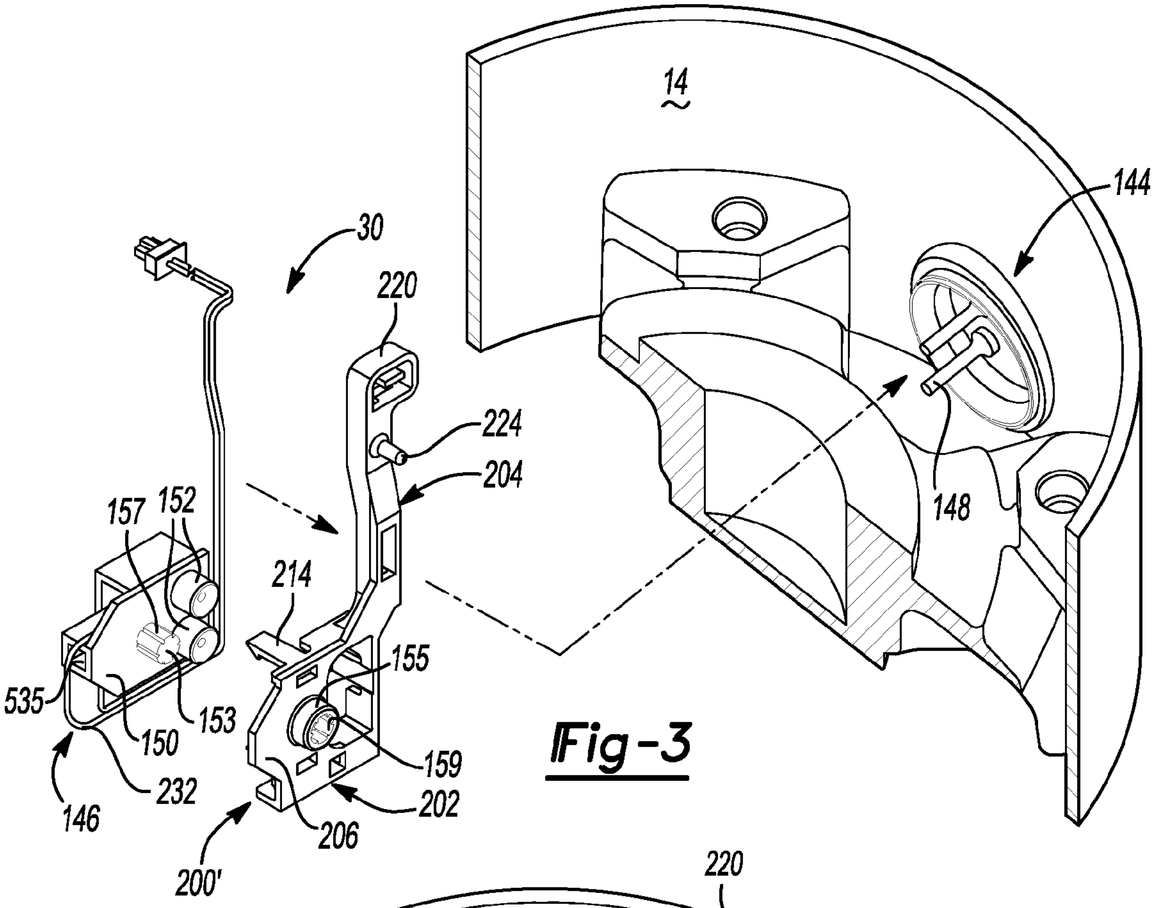
FIG. 3 is an exploded perspective view of a wire retaining system according to the present disclosure in an uninstalled state relative to a hermetic terminal.
Figure 4:
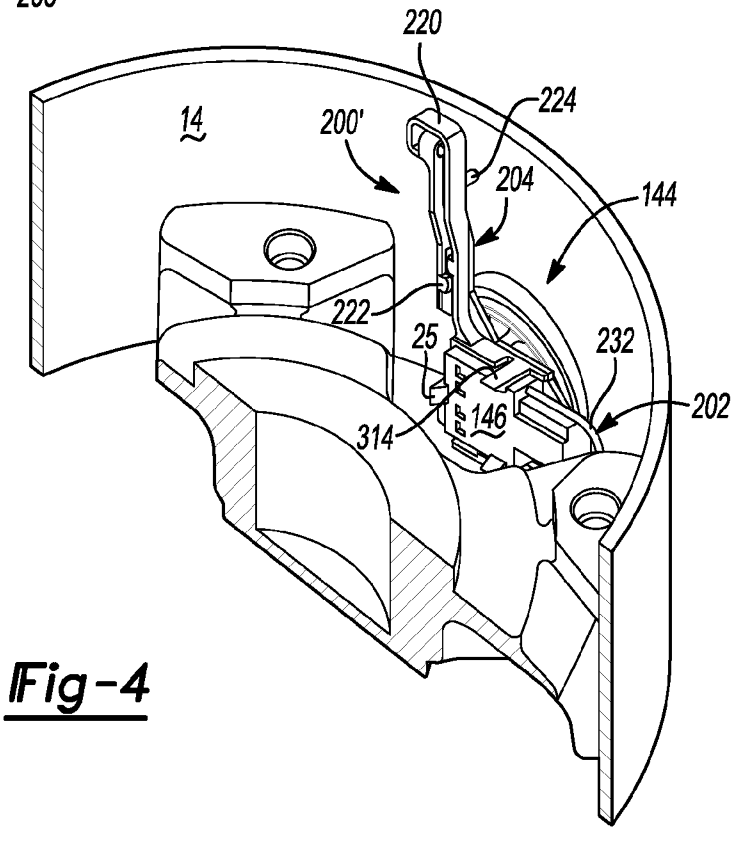
FIG. 4 is perspective view of a wire retaining system according to the present disclosure in an installed state relative to a hermetic terminal.
Figure 5A:
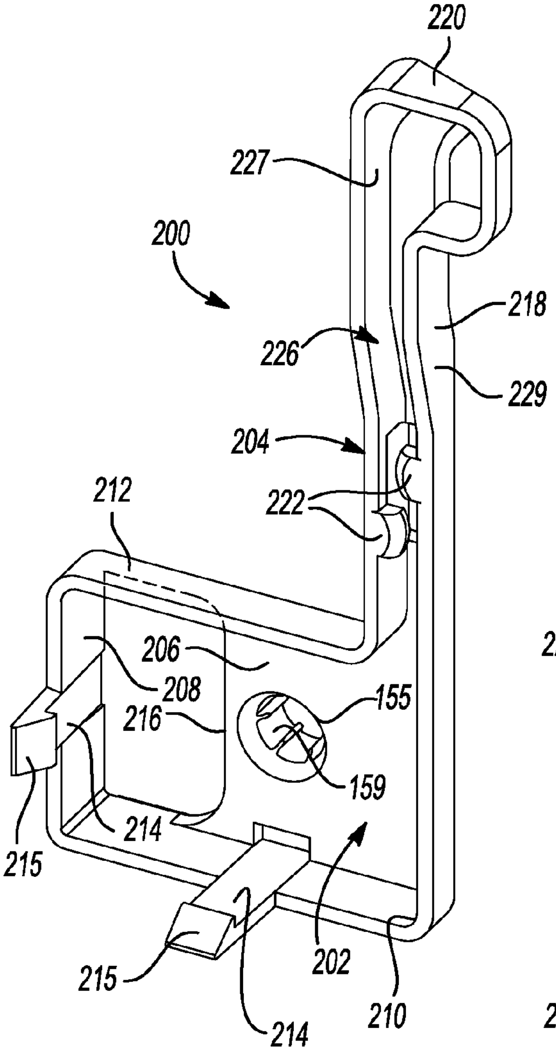
FIGS. 5A and 5B are a front and rear perspective view, respectively, of a wire retaining system according to the present disclosure.
Figure 6:
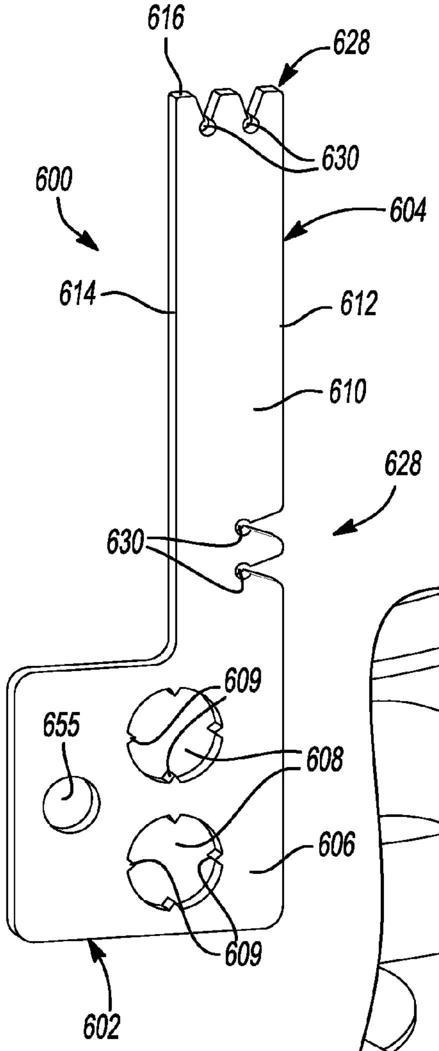
Figure 7:
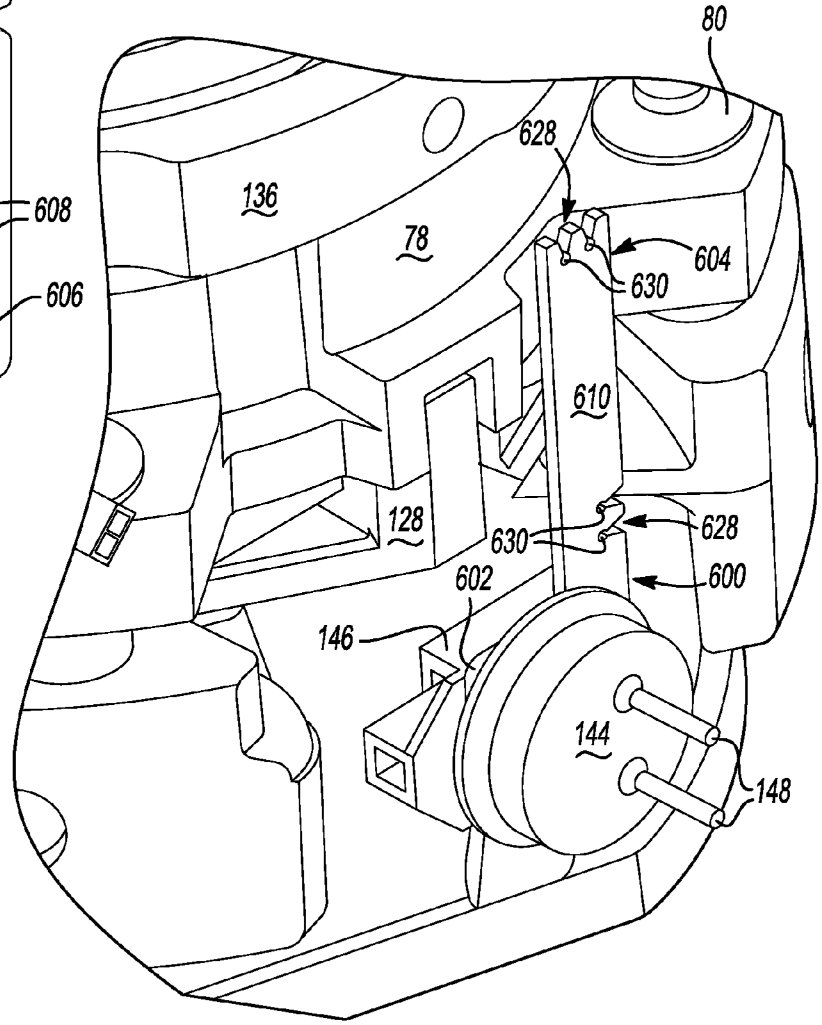
Figure 8:
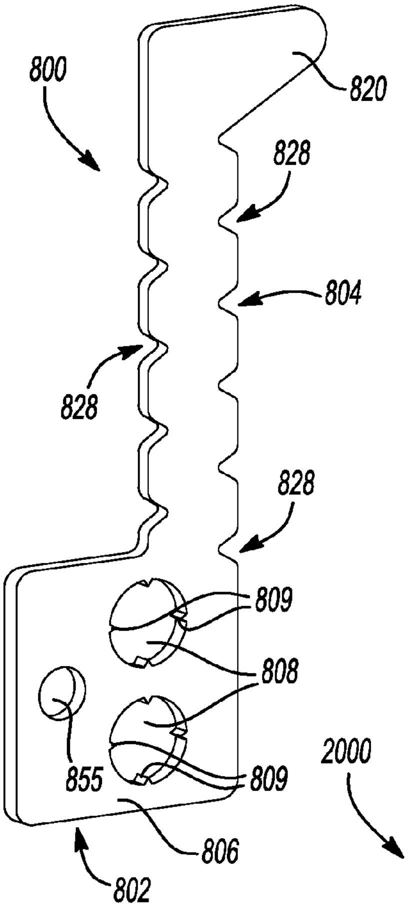
Figure 9:
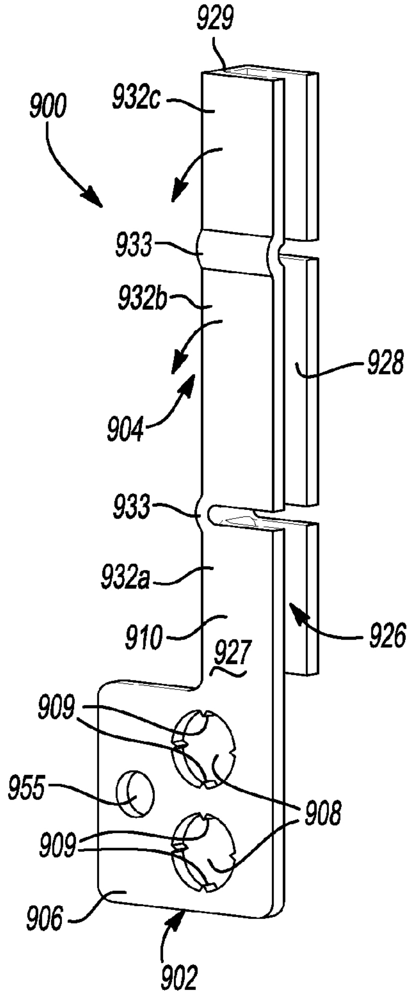
Figure 10:
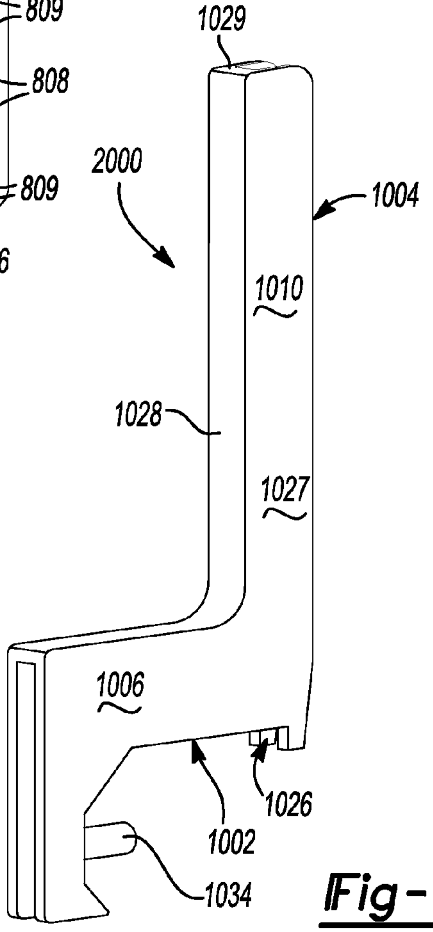
Figure 11:
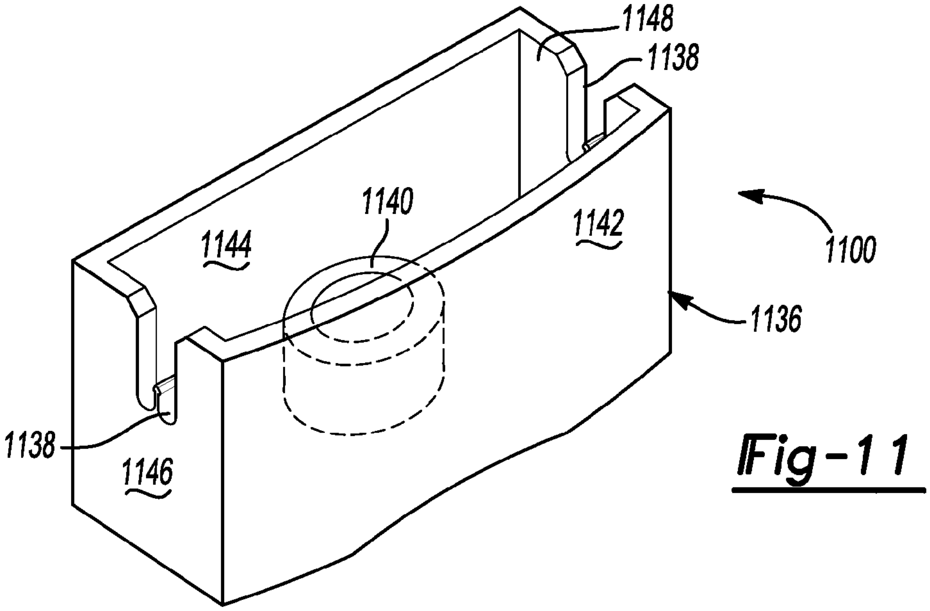
Figure 12:
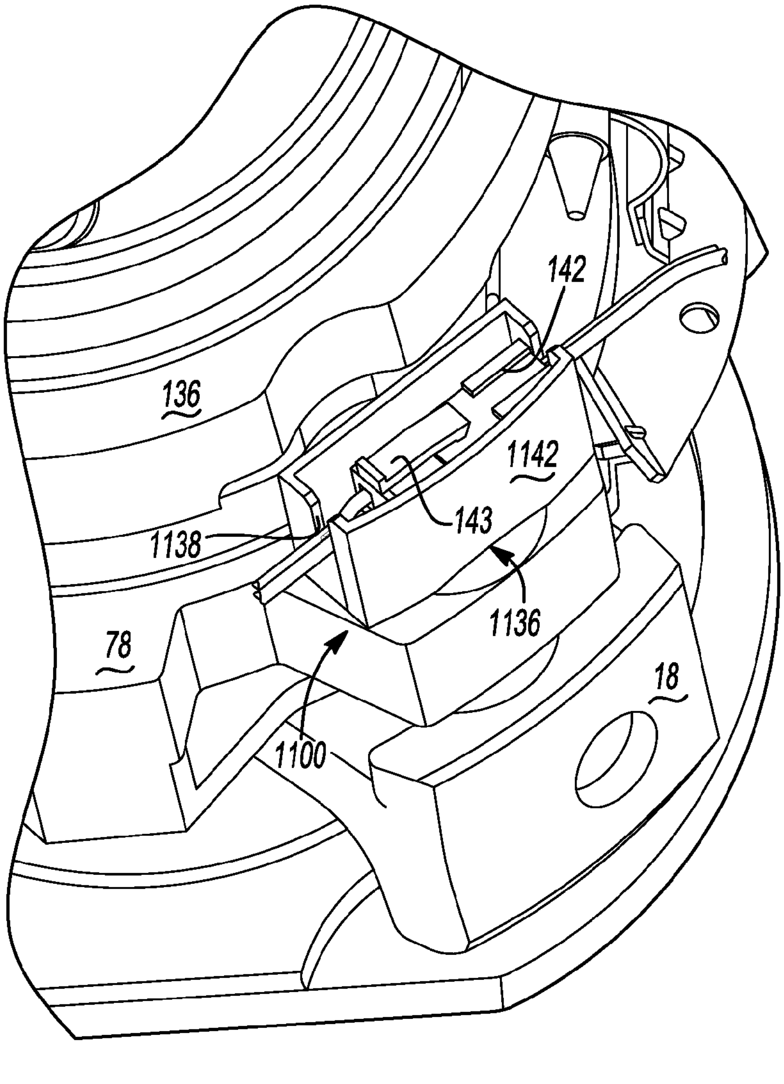
Figure 13:
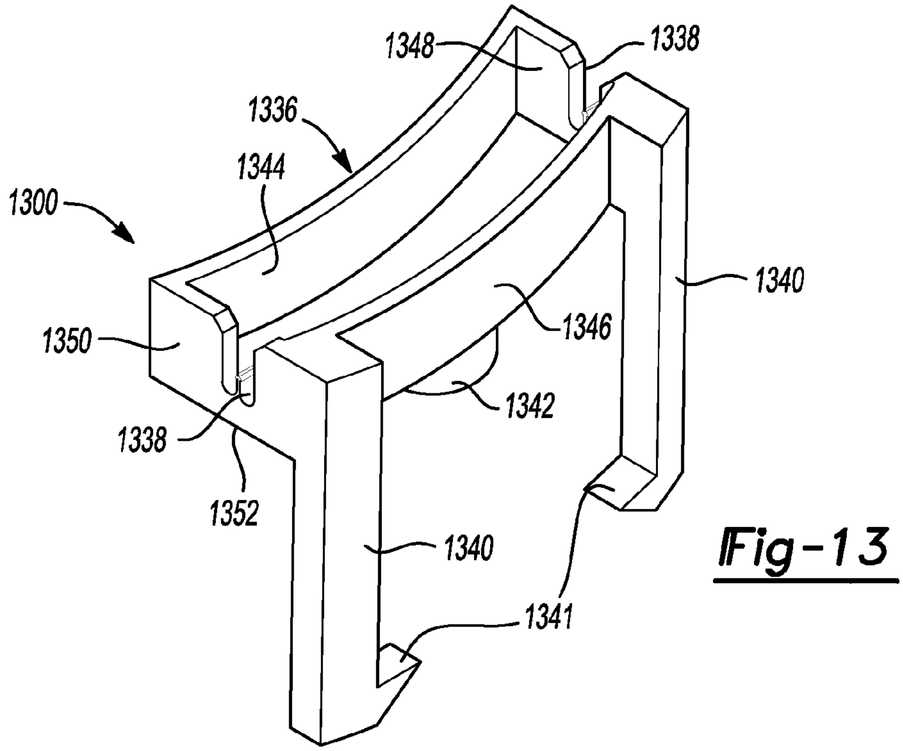
Figure 14:
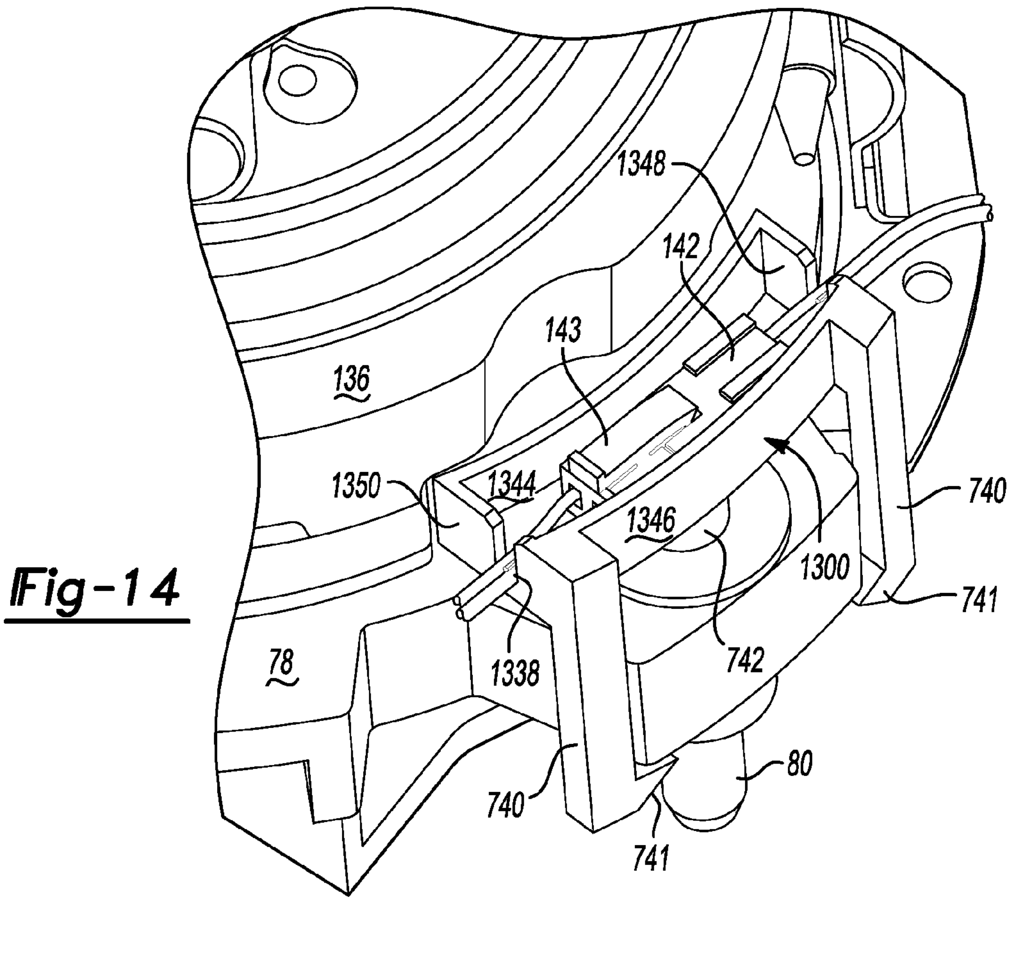

FIGS. 5A' and 5B' are a front and rear perspective view, respectively, of a wire retainer illustrated in FIGS. 3 and 4;

FIG. 6 is perspective view of a wire retainer according to the present disclosure;

FIG. 7 is a perspective view of a wire retainer illustrated in FIG. 6 in an installed state relative to a hermetic terminal;

FIG. 8 is perspective view of a wire retainer according to the present disclosure;

FIG. 9 is perspective view of a wire retainer according to the present disclosure;

FIG. 10 is perspective view of a wire retainer according to the present disclosure;

FIG. 11 is perspective view of a wire retainer according to the present disclosure;

FIG. 12 is a perspective view of a wire retainer illustrated in FIG. 11 in an installed state;

FIG. 13 is perspective view of a wire retainer according to the present disclosure; and FIG. 14 is a perspective view of a wire retainer illustrated in FIG. 13 in an installed state.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
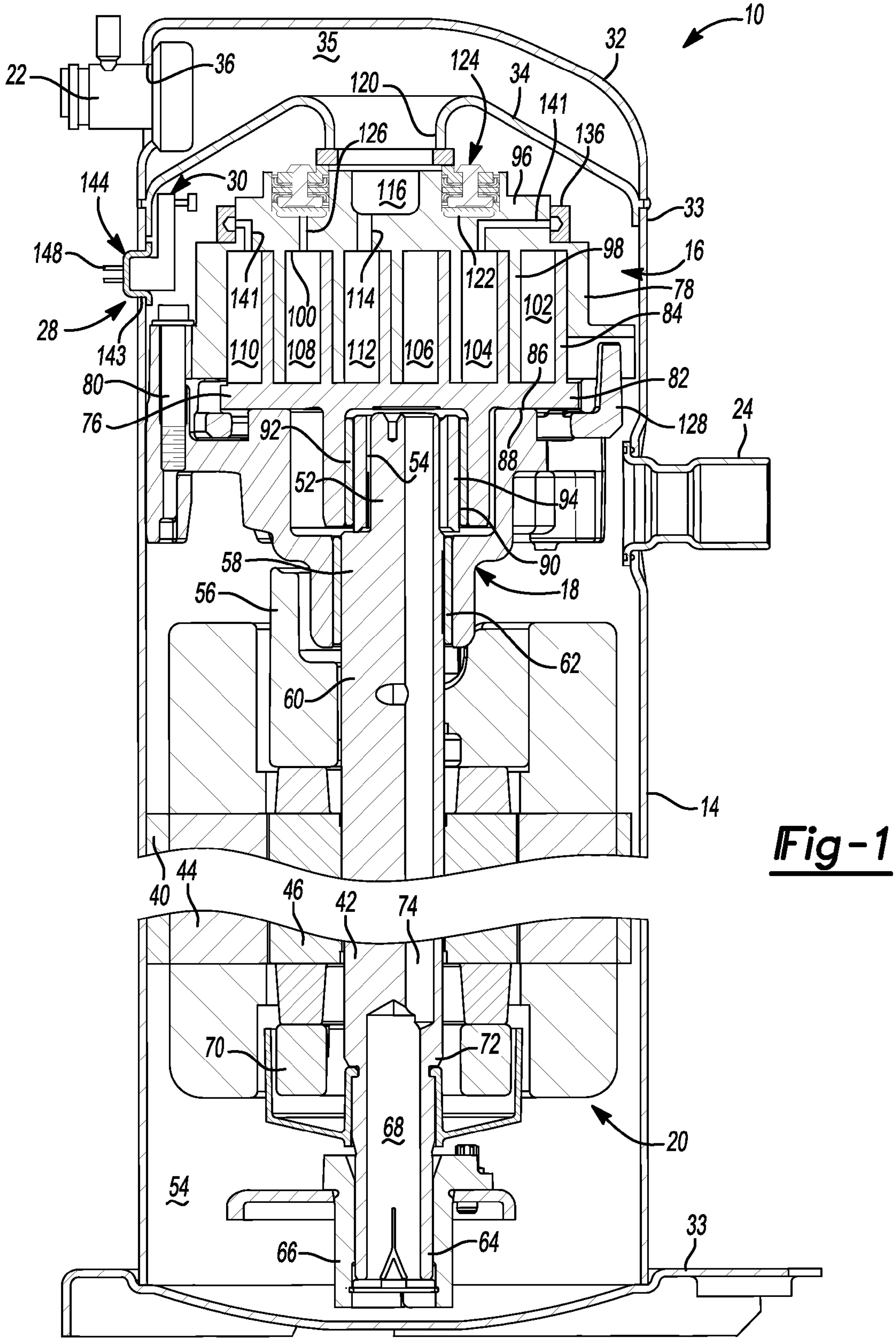
FIG. 1 is a cross-sectional view of a compressor according to the present disclosure.

FIG. 1 illustrates an exemplary compressor 10. Compressor 10 includes a cylindrical hermetic shell 14 that houses a compression mechanism 16 that may be supported by a main bearing housing 18 and driven by a motor assembly 20. Main bearing housing 18 may be affixed to shell 14 in any desirable manner.

Compressor 10 also includes refrigerant discharge fitting 22, a suction gas inlet fitting 24, a capacity modulation system 26 (see FIG. 2), an electrical assembly 28, and a wire assembly 30. Shell 14 may be enclosed by an upper end cap 32 and a lower end cap or base 33. Upper end cap 32 and a transversely extending partition 34 form a discharge chamber 35 where refrigerant discharge fitting 22 is attached to upper end cap 32 at an opening 36.

Motor assembly 20 generally includes a stator 44 and a rotor 46 that rotate a drive shaft 42. Stator 44 includes windings 48 and may be press fit into a frame 40, which may in turn be press fit into shell 14. Rotor 46 may be press fit on drive shaft 42. Rotor 46 includes counter-weights 56 and 70 at an upper and lower end 58 and 72, respectively.

Drive shaft 42 includes an eccentric crank pin 52 having a flat 54 thereon. Drive shaft 42 includes a first journal portion 60 rotatably journaled in a first bearing 62 in main bearing housing 18 and a second journal portion 64 rotatably journaled in a second bearing housing 66. Drive shaft 42 may include an oil-pumping concentric bore 68 that communicates with a radially outwardly inclined and relatively smaller diameter bore 74 extending to the upper end 58 of drive shaft 42. The lower interior portion 59 of shell 14 may be filled with lubricating oil. Concentric bore 68 may provide a pump action in conjunction with bore 74 to distribute lubricating fluid to various portions of compressor 10.

Compression mechanism 16 may include an orbiting scroll 76 and a non-orbiting scroll 78. Orbiting scroll member 76 includes an end plate 82 having a spiral vane or wrap 84 on an upper surface thereof and an annular flat thrust surface 86 on a lower surface thereof. Thrust surface 86 interfaces with an annular flat thrust bearing surface 88 on an upper surface of main bearing housing 18. A cylindrical hub 90 projects downwardly from thrust surface 86 and may include a journal bearing 92 having a drive bushing 94 rotatively disposed therein. Drive bushing 94 includes an inner bore in which crank pin 52 is drivingly disposed. Crank pin flat 54 drivingly engages a flat surface in a portion of the inner bore of drive bushing 94 to provide a radially compliant driving arrangement.

Non-orbiting scroll member 78 may include a bolt 80 and an end plate 96 having a spiral wrap 98 on lower surface 100 thereof. Spiral wrap 98 forms a meshing engagement with spiral wrap 84 of orbiting scroll member 76, thereby creating an inlet pocket 102, intermediate pockets 104, 106, 108, 110 and outlet pocket 112. Non-orbiting scroll 78 has a centrally disposed discharge passageway 114 in communication with outlet pocket 112 and upwardly open recess 116 which may be in fluid communication with discharge chamber 35 via an opening 120 in partition 34.

Non-orbiting scroll member 78 may include an annular recess 122 in the upper surface thereof having parallel coaxial side walls in which an annular floating seal 124 is sealingly disposed for relative axial movement. The bottom of recess 122 may be isolated from the presence of gas under suction and discharge pressure by floating seal 124 so that it can be placed in fluid communication with a source of intermediate fluid pressure by means of a passageway 126. Passageway 126 may extend into an intermediate pocket 104, 106, 108, 110. Non-orbiting scroll member 78 may therefore be axially biased against orbiting scroll member 76 by the forces created by discharge pressure acting on the central portion of scroll member 78 and those created by intermediate fluid pressure acting on the bottom of recess 122. Various additional techniques for supporting scroll member 78 for limited axial movement may also be incorporated in compressor 10. Relative rotation of the scroll members 76, 78 may be prevented by an Oldham coupling 128.

Figure 2:
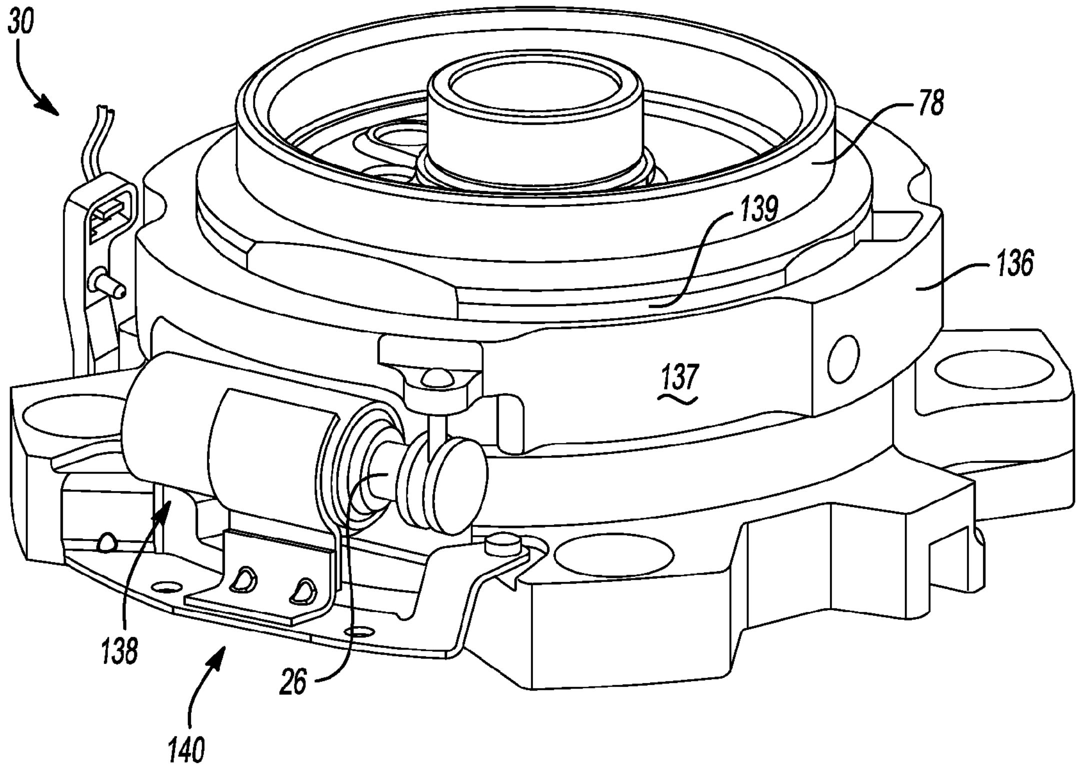
FIG. 2 is a perspective view of a capacity modulation and wire retaining system that may be used in a compressor.

As illustrated in FIG. 2, capacity modulation system 26 is coupled to non-orbiting scroll member 78. Capacity modulation system 26 includes a modulation ring 136, an actuation mechanism 138, and a wire assembly 30. Modulation ring 136 may include a generally annular body 137 that is rotatably disposed around exterior sidewall 139 of non-orbiting scroll member 78 for selectively venting one or more of intermediate fluid pockets 104, 106, 108, 110 through vents 141 (see FIG. 1) formed in non-orbiting scroll member 78. Actuation mechanism 138 may be formed by a solenoid having an extendable and retractable arm 140 coupled to modulation ring 136 to rotate modulation ring 136 to various positions. Upon rotation of modulation ring 136 by actuation mechanism 136, vents 141 are opened to provide fluid communication therethrough. In this manner, capacity of compressor 10 may be modulated.

Actuation mechanism 138 may be electrically coupled to electrical assembly 28 by wire assembly 30. Shown in FIG. 3, wire assembly 30 may include a plug or cluster block 146 and wire retainer 200' that assist in providing electric current to actuation mechanism 138. In FIGS. 3 and 4, electrical assembly 28 may include a hermetic terminal assembly 144 and cluster block 146. Hermetic terminal assembly 144 may be fixed to an aperture 143 formed in shell 14 and include a plurality of terminals 148 that provide electrical communication between a power source (not shown) external to shell 14 and an interior of shell 14.

Cluster block 146 includes a cluster body 150 including cylindrical extensions 152 that extend from body 150. Cluster block 146 may couple to electrical terminal 144 and be fixed relative shell 14. Cylindrical extensions 152 of body 150 provide a mating receptacle for terminals 148 of electrical terminal 144 to provide electrical communication to wire assembly 30.

Figure 5B:
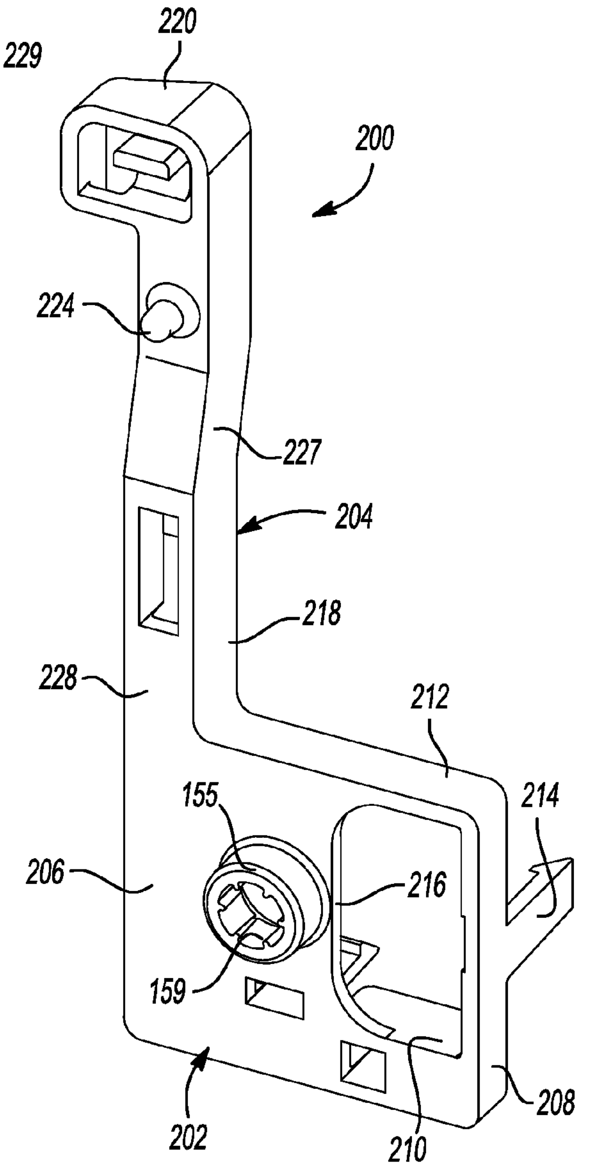
Figure 5A:
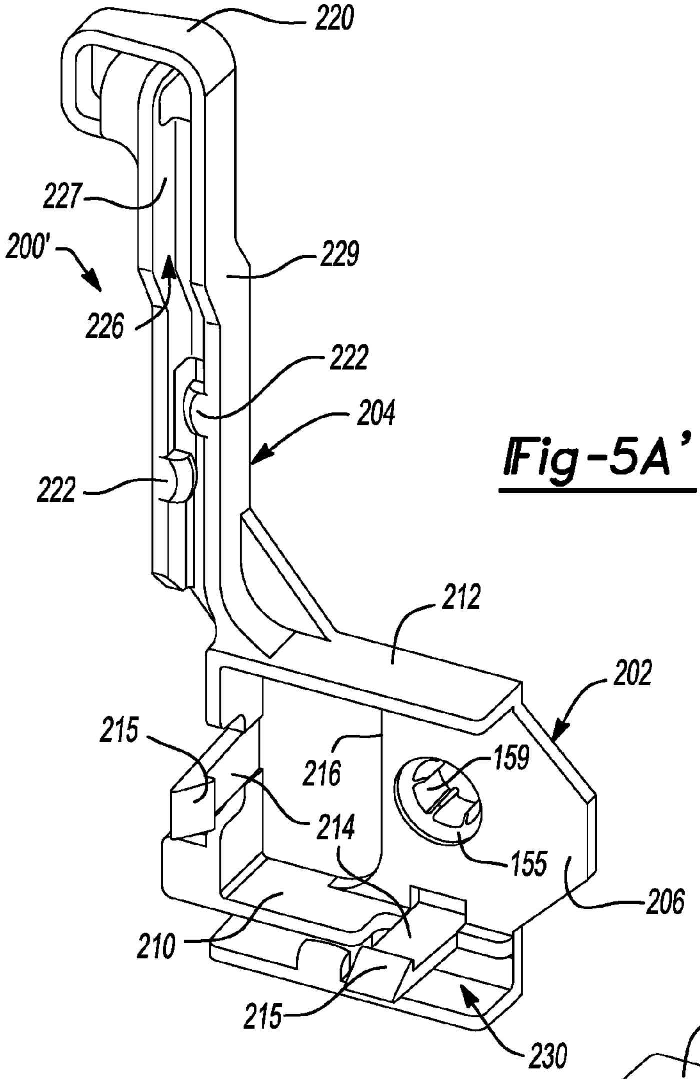
Figure 5B:
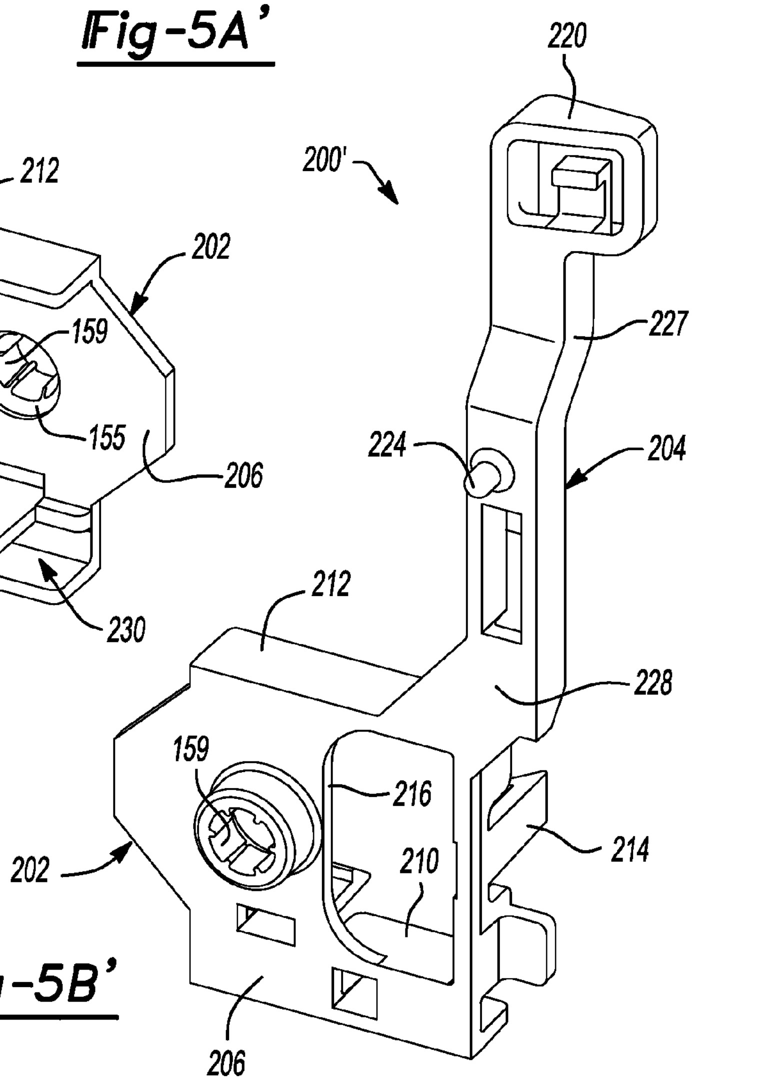

FIGS. 5A, 5B, 5A', and 5B' illustrate exemplary configurations of a wire retainer 200 and wire retainer 200'. First referring to FIGS. 5A and 5B, wire retainer 200 may be formed of a material such as nylon and include a mounting portion 202 and a guide portion 204. Mounting portion 202 may be formed of a plate 206 and first, second, and third walls 208, 210, and 212. Plate 206 may include an aperture 216 that accommodates cylindrical extensions 152 of cluster block 146. A plurality of fastening mechanisms 214 having a tab 215 at an end thereof extend from plate 206. Fastening mechanisms 214 secure cluster block 146 to retainer 200. Guide portion 204 extends from plate 206 and may include an arm 218, a tower 220, retaining features 222, and a spacing member 224. Arm 218 may be a U-shaped channel 226 formed by a first, second, and third sides 227, 228, and 229. Tower 220 may be formed at an end of arm 218, and may also be formed by a U-shaped channel.

Although guide portion 204 is illustrated in FIGS. 5A and 5B as being disposed at an end of mounting portion 202 that is opposite aperture 216, the present disclosure should not be limited thereto. For example, referring to FIGS. 5A' and 5B', wire retainer 200' may include a guide portion 204 that is disposed an end of mounting portion 202 that includes aperture 216. Moreover, plate 206 of mounting portion 202 does not necessarily require a wall (e.g., 208, 210, and 212) be formed around a perimeter of plate 206.

Referring again to FIG. 4, cluster block 146 may be coupled by retainer 200' by fastening mechanisms 214 and attached to hermetic terminal 144 such that wire retainer 200' may be secured between cluster block 146 and hermetic terminal 144. Fastening mechanisms 214 may be formed at any position around plate 206, as may be seen in FIGS. 3, 4, 5A, 5B, 5A', and 5B', without departing from the spirit and scope of the present disclosure. Cluster block 146 may also include a guide member 153 that mates with a guide receptacle 155 formed in plate 206. Guide member 153 may include a contoured surface 157 that coordinates with a reciprocal surface 159 of guide receptacle 155. Use of fastening mechanisms 214 and guide member 153 assist in ensuring that retainers 200 and 200' remains securely coupled to cluster block 146 during operation of compressor 10.

Wire retainers 200 and 200' may generally route and protect wires 232 in communication with cluster block 146 through channel 226 by locating the wires in a predetermined orientation. Retaining features 222 that extend inwardly from sides 227, 229 in U-shaped channel 226 keep wires within channel 226. Spacing member 224 may extend from arm 218 to distance arm 218 from nearby objects such as, for example, shell 14. Wire retainers 200 and 200' may be located radially outward relative to orbiting scroll member 76 and Oldham coupling 128 so that wires in wire retainer 200 and 200' are protected from orbiting scroll member 76, non-orbiting scroll member 78, and Oldham coupling 128 during operation of compressor 10. Wire retainers 200 and 200' may also shield and protect wire within channel 226 from heat produced during welding operations. For example, when end cap 32 and partition 34 are welded to shell 14.

In addition to channel 226, wire retainer 200' illustrated in FIGS. 5A' and 5B' may also include an auxiliary channel 230. Auxiliary channel 230 assists in routing wires 232 of cluster block 146 that protrude from cluster block 146 in a direction opposite to a direction in which the wires 232 are to be directed within shell 14. That is, referring to FIG. 4, when cluster block 146 is mounted to wire retainer 200', wires 232 of cluster block 146 protrude from cluster block 146 in a direction towards the right in the figure. Because wires 232 may need to be routed to a component within compressor 10 that is located in a direction opposite to the direction in which wires 232 extend from cluster block 146, wires 232 may be routed through channel 230 and up into channel 226. Wires 232 may then be routed from tower 220 to the component that may require electric current (e.g., actuation mechanism 138).

In contrast to wire retainer 200', wire retainer 200 illustrated in FIGS. 5A and 5B may be used when wires 232 are to be routed in a direction that is the same as the direction in which wires 232 extend from cluster block 146. In this regard, if wires 232 extend from cluster block 146 to the right like that shown in FIG. 4, wires 232 may simply be routed from cluster block 146 up channel 226 of wire retainer 200 and out from tower 220 to the component that may require electric current. In this regard, components that may require electric current other than actuation mechanism 138 include motor assembly 20 and various sensors (not shown) that provide diagnostic information. For example, sensors may provide diagnostics related to compressor mechanical failures, motor failures, and electrical component failures such as missing phase, reverse phase, motor winding current imbalance, open circuit, low voltage, locked rotor currents, excessive motor winding temperature, welded or open contactors, and short cycling. The sensors may also monitor compressor current and voltage to determine, and differentiate between, mechanical failures, motor failures, and electrical component failures. In addition, the sensors may monitor parameters such as discharge temperature, suction and discharge pressure, oil levels, vibration, capacity control, oil injection, and liquid injection.

Selection of wire retainer 200 and 200', therefore, may be based on a configuration of the components within compressor 10 that may require electric current. In this manner, a length of wires 232 may be kept to a minimum depending on which wire retainer 200 or 200' is selected.

Now referring to FIGS. 6-10, alternate configurations of a wire retainer are described. Referring to FIGS. 6 and 7, a wire retainer 600 includes a mounting portion 602 and an guide portion 604. Similar to wire retainer 200 described above, mounting portion 602 may generally be in the form of a plate 606 with a plurality of apertures 608 that accommodate cylindrical extensions 152 of cluster block 146, and a guide receptacle 655 for accommodating guide member 153. Apertures 608 may have securing features 609 that assist in securing cylindrical extensions 152 of cluster block 146 to mounting portion 602. Guide portion 604 may include an arm 610 having a plurality of notches 628 formed in edges 612, 614, and 616 thereof. Notches 628 may include recesses 630 that assist in retaining a wire in notches 628.

Wire retainer 600 may be secured between cluster block 146 and hermetic terminal 144, relative to shell 14, and fixed radially outward from scroll members 76, 78 and Oldham coupling 128. Wire retainer 600 may route wires in communication with cluster block 146 by locating the wires in a predetermined orientation to protect wires from orbiting scroll member 76 and Oldham coupling 128 during operation of compressor 10. Wire retainer 600 may also shield and protect wire from heat produced during welding operations.

Now referring to FIG. 8, a wire retainer 800 that is similar to wire retainer 600 is illustrated, with the difference being that notches 828 are formed along substantially the entire length of guide portion 804. Further, although notches 828 are illustrated as not including recesses 630, it should be understood that notices 828 may be formed to include recesses 630 without departing from the spirit and scope of the present disclosure. Wire retainer 800 also differs from wire retainer 600 by inclusion of an tower 820. Similar to wire retainer 600, wire retainer 800 may include a mounting portion 802 in the form of a plate 806 with apertures 808 passing therethrough. Apertures 808 may have securing features 809 for receiving and securing cluster block 146.

Now referring to FIG. 9, a wire retainer 900 having a mounting portion 902 in the form of a plate 906 with apertures 908 passing therethrough is illustrated. Similar to above configurations, apertures 908 may have securing features 909 for receiving and securing cluster block 146. Guide portion 904 may be formed by an arm 910 in the form of a U-shaped channel 926 formed by a first, second and third side 927, 928, and 929. Guide portion 904 may also include one or more stacked sections 932*a*, 932*b*, and 932*c* that may be coupled together by hinges 933 formed in one of the sides 927, 928, and 929. Through use of hinges 933, stacked sections 932*a*, 932*b*, and 932*c* are movable relative each other. In this regard, for example, stacked section 932*b* may move relative section 932*a* and stacked section 932*c* may move relative stacked section 932*b*.

Wire retainer 900 may be secured between cluster block 146 and electrical terminal 144, relative to shell 14, and fixed radially outward scroll members 76, 78 and Oldham coupling 128. Wire retainer 900 may generally route wire in communication with cluster block 146 by locating the wire in a predetermined orientation that may be changed by moving stacked sections 932*a*, 932*b*, and 932*c* relative each other. Further, because wire retainer 900 may be located radially outward orbiting scroll member 76 and Oldham coupling 128, wire retainer 900 assists in protecting wires from orbiting scroll member 76 and Oldham coupling 128 during operation of compressor 10, and shields and protects wires from heat that may be generated during welding operations.

Now referring to FIG. 10, a wire retainer 1000 may include a mounting portion 1002 and a guide portion 1004. Mounting portion 1002 may include body 1006 and a protrusion 1034. Body 1006 may be shaped to receive cluster block 146. Guide portion 1004 may generally be an arm 1010 in the form of a U-shaped channel 1026 formed by a first, second and third side 1027, 1028, 1029. Protrusion 1034 may fit into a recess 535 of cluster block 146 (see FIG. 3) to couple wire retainer 1000 to cluster block 146. Cluster block 146 may be located within mounting portion 1002 and fixed to electrical terminal 144.

Wire retainer 1000 may be secured about cluster block 146, relative to shell 14, and fixed radially outward scroll members 76, 78 and Oldham coupling 128. Wire retainer 1000 may generally route wire in communication with cluster block 146 through protective channel 1026 by locating the wire in a predetermined orientation. Wire retainer 1000 is located radially outward relative orbiting scroll member 76 and Oldham coupling 128. Wire in wire retainer 500 is protected from orbiting scroll member 76 and Oldham coupling 128 during operation of compressor 10. Wire retainer 1000 may also shield and protect wire within channel 1026 from heat produced by welding operations.

As seen in FIGS. 11 and 12, an alternative wire retainer 1100 may include a hollowed body 1136, a plurality of notches 1138, and a recess 1140. Hollowed body 1136 may generally be formed by sides 1142, 1144, 1146, 1148 and 1150 and may function similar to guide portion 204 of wire retainer 200 described above. Notches 1138 may be formed in sides 1146, 1148. Recess 1140 may be cylindrical and recede into side 1150 of hollowed body 1136 so that side 1150 may function similar to mounting portion 202 of wire retainer 200 described above. Recess 1140 may accommodate bolt 80 (see FIG. 1) to thereby fix wire retainer 1100 to non-orbiting scroll 78 and radially outward relative orbiting scroll 76 and Oldham coupling 128. Wire retainer 1100 may generally route wire and clips 142, 143 through hollowed body 1136 by locating the wire in a predetermined orientation. Notches 1138 may hold wires in place and prevent movement so that the wires are protected from orbiting scroll member 76 and Oldham coupling 128 during operation of compressor 10. Wire retainer 1100 may also shield and protect wire within hollowed body 1136 from heat that may be produced during welding operations.

Now to FIGS. 13 and 14, an alternative wire retainer 1300 may include a hollowed body 1336, notches 1338, arm extensions 1340 and cylindrical extension 1342. Hollowed body 1336 may generally be saddle-like and formed of sides 1344, 1346, 1348, 1350 and 1352 and may function similar to guide portion 204 of wire retainer 200 described above. Notches 1338 may be formed in sides 1348, 1350. Cylindrical extension 1342 may extend from side 1352 of hollowed body 1336 so that side 1352 may function similar to mounting portion 202 of wire retainer 200 described above. Arm extensions 1340 may have a tab 1341 on one end thereof that fixes to an underside 79 of fixed scroll 78 to assist in securing wire retainer 1300 to fixed scroll member 78. Moreover, extension 1342 may accommodate bolt 80 to secure wire retainer 1300 to non-orbiting scroll 78 and radially outward relative to orbiting scroll 76 and Oldham coupling 128. In this regard, arm extensions 1340 and tabs 1341 clipping about non-orbiting scroll 78 also assist in maintaining engagement between extension 1342 and bolt 80.

Wire retainer 1300 routes wire and clips 142, 143 through hollowed body 1336 by locating the wire in a predetermined orientation. Notches 1338 may hold wire in place and prevent movement. Because wire retainer 1300 is located radially outward relative orbiting scroll member 76 and Oldham coupling 128, the wires in wire retainer 1300 are protected from orbiting scroll member 76 and Oldham coupling 128 during operation of compressor 10. Wire retainer 1300 may also shield and protect wire within hollowed body 1336 from heat that may be produced during welding operations.

The above description is merely exemplary in nature and, thus, variations that do not depart from the gist of the present disclosure are intended to be within the scope of the present disclosure. Such variations are not to be regarded as a departure from the spirit and scope of the present disclosure.

What is claimed is:

1. A compressor comprising:
- a shell including an aperture;
- a compression mechanism disposed within said shell;
- a hermetic terminal assembly including at least one terminal passing through said aperture for supplying electric current through a wire to a component located within said shell;
- a plug including said wire, said plug being electrically engaged with said at least one terminal;
- a wire retainer disposed between said plug and said hermetic terminal assembly, said wire retainer including a mounting portion securing said wire retainer relative said shell and a guide portion connected to said mounting portion for positioning said wire in a predetermined orientation.

2. The compressor of claim 1, wherein said plug includes a guide member and said mounting portion includes a guide receptacle for receiving said guide member.

3. The compressor of claim 2, wherein said guide member includes a contoured surface and said guide receptacle includes a reciprocal surface that corresponds to said contoured surface.

4. The compressor of claim 1, wherein said guide portion defines a channel and said wire is disposed within said channel.

5. The compressor of claim 1, wherein said guide portion extends from said mounting portion at an end of said mounting portion that is located in a direction of said component.

6. The compressor of claim 1, wherein said compression mechanism includes an orbiting scroll member and a non-orbiting scroll member.

7. The compressor of claim 1, wherein said component is a capacity modulation system.

8. The compressor of claim 1, wherein said guide portion includes at least one notch for securing said wire.

9. The compressor of claim 1, wherein said guide portion includes a plurality of sections that are coupled by hinges and movable relative each other.

10. The compressor of claim 7, wherein said capacity modulation system includes a solenoid for actuating said capacity modulation system and said wire connects to said solenoid.

11. A compressor comprising:

a cylindrical shell including an aperture;

a hermetic terminal assembly including at least one terminal passing through said aperture for supplying electric current through a wire to a component located within said shell;

a plug including said wire, said plug being electrically connected to said terminal;

a wire retainer assembly disposed between said plug and said hermetic terminal assembly, said wire retainer assembly including a mounting portion securing said wire retainer to said plug and a guide portion positioning said wire in a direction from said aperture to said component.

12. The compressor of claim 11, further comprising a compression mechanism disposed within said shell that includes an orbiting scroll member and a non-orbiting scroll member.

* * * * *

UNITED STATES PATENT AND TRADEMARK OFFICE

CERTIFICATE OF CORRECTION

PATENT NO. : 8,262,373 B2
APPLICATION NO. : 12/365655
DATED : September 11, 2012
INVENTOR(S) : Charles E. Reynolds et al.

It is certified that error appears in the above-identified patent and that said Letters Patent is hereby corrected as shown below:

| | |
|---|---|
| Column 1, Line 37 | "extends" should be --extend--. |
| Column 2, Line 62 | After "is" insert --a--. |
| Column 3, Line 3 | After "is" insert --a--. |
| Column 3, Line 7 | After "is" insert --a--. |
| Column 3, Line 9 | After "is" insert --a--. |
| Column 3, Line 11 | After "is" insert --a--. |
| Column 3, Line 13 | After "is" insert --a--. |
| Column 3, Line 17 | After "is" insert --a--. |
| Column 4, Lines 49-50 | "actuation mechanism 136" should be --actuation mechanism 138--. |
| Column 6, Line 40 | "an guide" should be --a guide--. |
| Column 6, Line 66 | "notices 828" should be --notches 828--. |
| Column 7, Line 2 | "an tower 820" should be --a tower 820--. |

Signed and Sealed this
Fifth Day of February, 2013

Teresa Stanek Rea
*Acting Director of the United States Patent and Trademark Office*